April 18, 1933.　　　J. CLAYTON　　　1,904,411
WINDING MECHANISM
Filed March 28, 1931　　　2 Sheets-Sheet 1
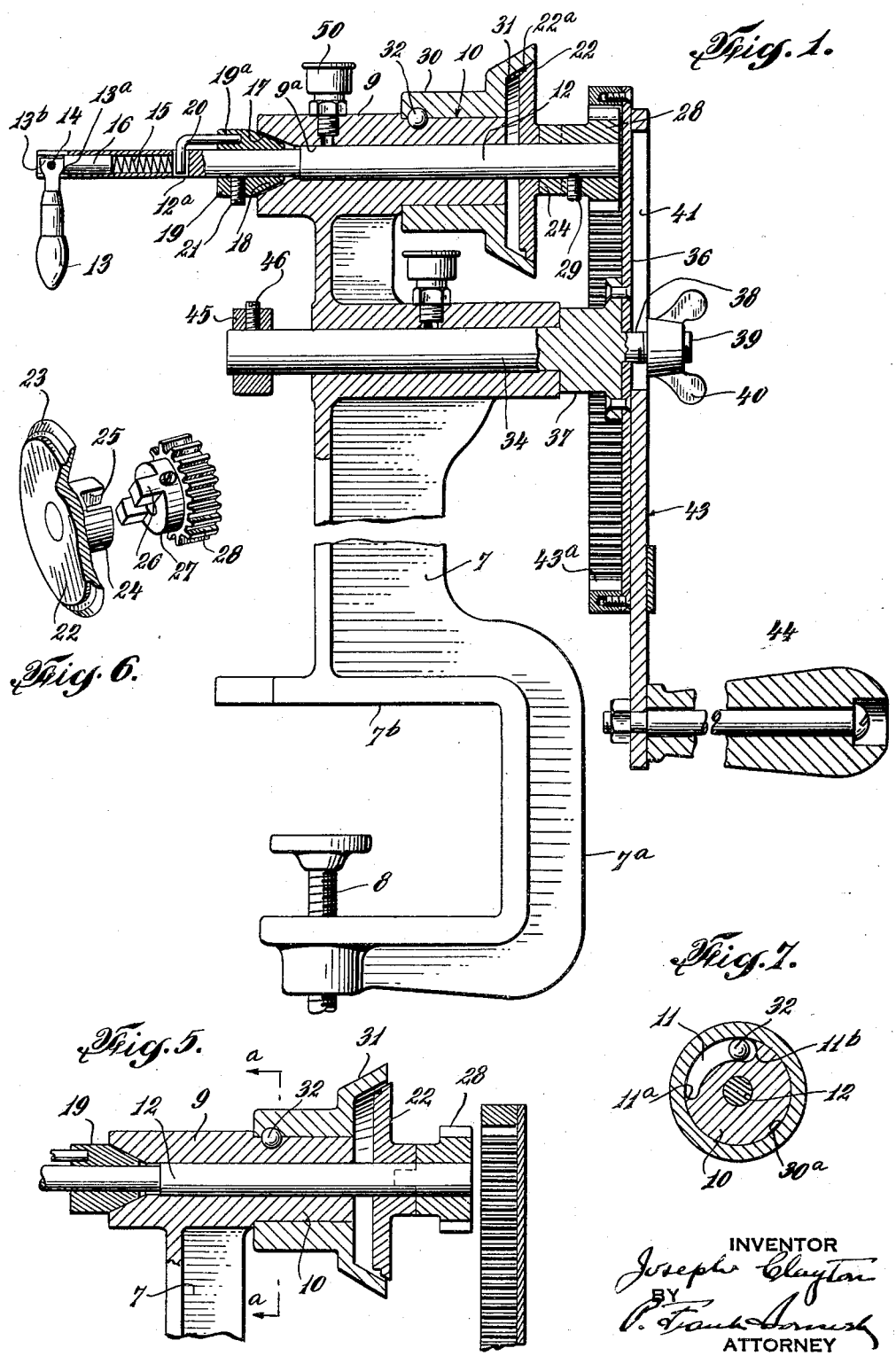

April 18, 1933.   J. CLAYTON   1,904,411
WINDING MECHANISM
Filed March 28, 1931   2 Sheets-Sheet 2
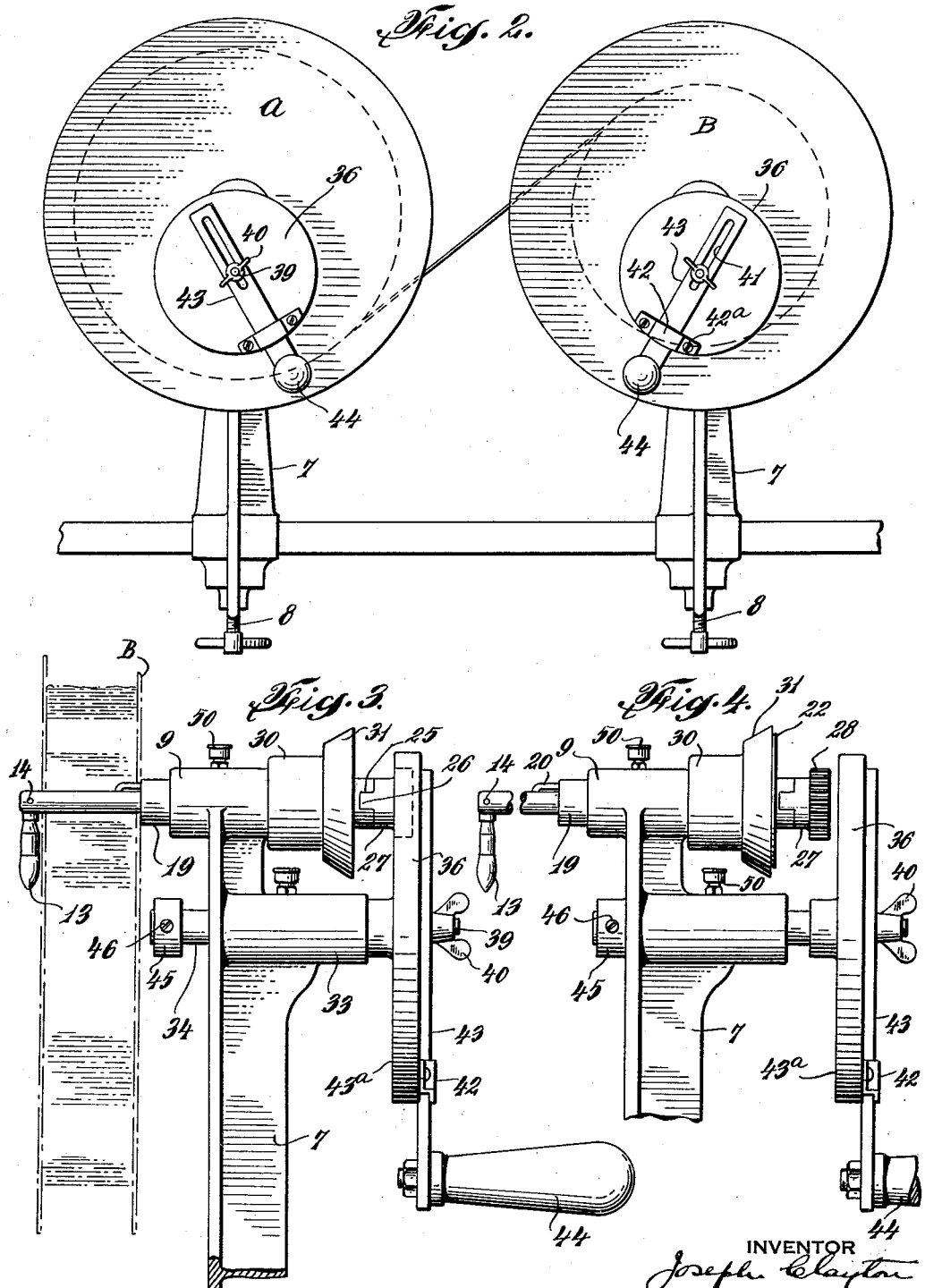

Patented Apr. 18, 1933

1,904,411

UNITED STATES PATENT OFFICE

JOSEPH CLAYTON, OF NEW YORK, N. Y.

WINDING MECHANISM

Application filed March 28, 1931. Serial No. 525,894.

This invention relates generally to an apparatus for winding material upon spools, reels, or other suitable receivers, and is more particularly directed to mechanisms that are designed for use in effecting the transfer of wound material from one device or carrier, upon which it is disposed, to another by winding it thereupon, as in the practicing of a so-called rewinding operation.

In United States Letters Patent No. 1,725,443 granted to me August 20, 1929, I disclosed a form of mechanism, for use in rewinding or transferring various materials from one carrier to another, that has certain characteristics whereby the material is maintained at an even tension throughout the transferring operation, so that it will be disposed upon the receiving carrier with the windings or convolutions in that close and uniform registration which is especially essential where the material delivered to the receiving carrier is to be withdrawn or unwound therefrom in a subsequent operation.

In prefacing the disclosure of the invention of my aforesaid Letters Patent, I have pointed out this necessity for subjecting materials to a certain amount of tension during a winding operation in order that they may be compactly and uniformly wound, it being obvious that if they were not maintained under tension that winding could not be satisfactorily effected. I have also referred to the shortcomings of prior art mechanisms which the invention of my said Letters Patent was designed to obviate, emphasizing the advantages which flow from the practicing of the invention disclosed, particularly with respect to the manner in which the relative changes in the loads on the discharging and receiving material carriers and the concomitant variations in peripheral speeds are utilized in controlling the tension under which the material is maintained in the rewinding operation.

The present invention is in the nature of an improvement upon that of my aforesaid Letters Patent, and its general object is to attain greater efficiency in the utilization of the generic principle of my prior invention. More specifically, it is the object of this invention to reduce the time required for executing a re-winding operation by an expenditure of less effort on the part of the operator of the mechanism, than was heretofore necessary, and to increase the effectiveness of those elements which cooperate with the material to develop and maintain the proper tension, in the performance of their intended functions.

Other objects and advantages flowing from the practicing of this invention will become evident as the description proceeds, and I would have it understood that I reserve unto myself all rights to the full range of equivalents, both in structure and in uses, to which I may be entitled under my invention in its broadest aspect.

For the purposes of the present disclosure, I have shown a preferred embodiment of my invention, which may be employed in transferring any material, that may be wound upon a carrier or support, from one device to another and which especially responds to the conditions that are met in re-winding motion picture films, wire and similar materials that possess an inherent resiliency which must be constantly controlled in order to insure proper disposition thereof upon the receiving carrier, whether it be a spool, reel or winding-board or other element.

In the drawings:

Figure 1 is an elevation, partly in section, of one of the units of my improved mechanism.

Figure 2 is a view showing two units embodying my invention, in front elevation, as they are mounted to cooperate for the performance of a re-winding operation.

Figure 3 is a side elevation of a portion of one of the units, showing the relative positions of the parts thereof, when such unit is to function as a winder.

Figure 4 is a view similar to Figure 3, illustrating the relative position of its parts, when the unit is the carrier of the device from which the material is discharged or unwound.

Figure 5 is an enlarged sectional detail of the unit structure, as shown in Figure 4.

Figure 6 is a view in perspective of one of the clutch elements and the associated driving pinion, and Figure 7 is a cross-section on the line a—a of Figure 5.

Referring now to the drawings in detail, in which like characters of reference are employed to designate similar parts in the several views, 7 indicates the standard of a unit of my improved rewinding apparatus, which may be of cast metal or other suitable material and preferably embodies a base portion 7$^a$ corresponding to the conventional design of C-clamp, whereby the unit may be fixed to a table, bench or the like, by means of the adjustable screw 8, the bearing portion 7$^b$ of the standard being of a sufficient width to insure lateral stability to the unit when so supported.

As will be observed, the standard 7 has a preferably integral head 9 including an undercut annular surface 10 which forms a bearing for the hub 30 of a female clutch element having an internal bevelled or chamfered surface 31, complemental to the inclined perimeter 23 of the male clutch member 22 which is mounted upon the shaft 12 journaled in the bearing provided by the bore 9$^a$ in the head 9.

The outer face of the hub 24 of the clutch member 22 is recessed or slotted, as at 25, to receive the registering lugs 26 projecting from the hub of the pinion 28, the latter of which is fixed to said shaft 12 by a set screw 29, it being obvious that the pinion 28, and the clutch member 22, due to the interlocking engagement of their hubs, will rotate with shaft 12.

One end of the bore 9$^a$ of the head 9 merges into a conical bearing surface 17 for the complemental portion 18 of the member 19, the annular body of said member being recessed, as at 19$^a$ to receive the key piece 20 which is provided with an offset to enter the aperture 12$^a$ in the shaft 12. This key functions to couple the member 19 to said shaft for rotative movement therewith, and is also adapted to cooperate with a key slot of a work carrier when positioned upon the free end of said shaft, as and in the manner hereinafter explained, the set screw 21 in cooperation with the key 20 positively locking said member against movement relative to said shaft.

For transmitting rotative motion to the shaft 12, I employ a ring gear 35, the inwardly directed teeth of which are adapted to mesh with the teeth of the pinion 28. This ring gear, in the embodiment of the invention shown, is pinned to an annular disc or plate 36 having a centrally located hub 37 fixed to the shaft 34 journaled in the sleeve or bearing 33, perfectly integral with the standard 7 and below the head 9, the end of said shaft 34 being reduced to provide a shoulder 38 and a threaded continuation 39 which project beyond the outer face of the disc 36.

An actuating crank, embodying an arm 43, carrying an offset handle or grip 44, is provided for rotating said disc 36 and the elements driven by the ring gear carried thereby, this crank, preferably being adjustably mounted so that the effective leverage may be varied to suit the work being performed. In the present showing, the arm 43 is slotted, as at 41 and is slidable within the conforming strap 42, fixed to the disc 36 adjacent its periphery, as at 42$^a$, the sides of the slot 41 riding upon the flat surfaces of the aforesaid shoulder 38, the arm being locked in its adjusted position by means of the wing nut 40 threaded upon the extension 39 of the shaft 34.

As will be noted from the drawings, the shaft 34 is longer than its bearing 33, the end of said shaft opposite to that on which the disc 36 is fixed, being provided with a collar or stop 45 secured to said shaft by a set screw 46, the face of the web portion of the standard 7 surrounding the bore of the sleeve 33 being preferably recessed to provide a suitable bearing for the abutting face of said stop or collar.

From the foregoing, it will be evident that the shaft 34 will be capable of longitudinal movement in its bearing, within the limits defined by the hub 37 and the collar or stop 45, the teeth of the pinion and ring gear being in mesh in one of these positions, while they are disengaged in the other.

The portion end of the shaft 12, outwardly of the key 20, which functions as the work support, may be provided with any suitable device for retaining a work-holder in position thereon. In the present instance, the said shaft is shown as embodying a lock corresponding to the conventional design used in conjunction with motion picture spools or reels, which includes an arm 13 pivoted at 14 in the split end of the shaft which is adapted to receive the spring 15 and plunger 16 abutting thereupon, it being apparent that the arm will be held in its horizontal or vertical positions by the pressure of the plunger upon one of the flat surfaces 13$^a$ or 13$^b$ thereof in response to the expansion action of the spring. When it is desired to position the work-holding element upon the shaft, the arm 13 is aligned with the shaft and the work-holder passed thereover to engage its key-way with the key 20, the arm 13 being then turned to the position shown in Figure 1, to retain the work-holder in its keyed engagement with said shaft.

When it is desired to perform a rewinding operation, two units are employed, fixed side by side to a suitable support, as illustrated in Figure 2. The holder or reel upon which the material to be transferred is to be wound, is positioned, as described, upon the supporting end of the shaft 12 of the unit at the left, and the free end of the material is then brought from the under-side of the reel and attached to the hub of the receiving reel or spool in the usual manner, the latter reel or spool being fixed to the shaft 12 of the unit at the right. In the re-winding or transferring operation the spool or reel on the right-hand unit revolves clock-wise while the motion of the left-hand unit is anti-clockwise, the ring gear of the latter unit being disengaged from the pinion 28 thereof by the manual outward movement of the shaft 34, to the position shown in Figure 4, the pinion and ring gear of the winding unit at the right remaining in mesh, as in Figure 3.

The female clutch 31 is provided with an annular internal groove 30ª that functions as a race for the ball 32 which is retained within the arcuate peripheral recess 11 of the bearing 10, the said recess graduating from its maximum depth at one end 11ª to a minimum depth at its opposite end 11ᵇ, it being apparent that said ball will function, in conjunction with the recess 11 and the race 30ª to lock the clutch member 31 against rotative movement in an anti-clockwise direction, the said clutch member being free to turn clock-wise in response to variations in the pressure existing between the contacting surfaces of the two clutch members.

The pinion 28 with the interlocked clutch member 22 of each unit are so adjusted, relative to the shaft 12, that the latter will be capable of a limited longitudinal movement, to permit the conical surface of the member 19 to move outwardly and inwardly of its tapered bearing, in order that the frictional pressure between the effective surfaces of the two clutch members 22 and 31 may vary in response to load changes on said shaft.

Now, as the receiving reel is rotated by the actuation of the crank of the right-hand unit, the load of the gradually multiplying windings will be transmitted to the shaft 12 transversely of its axis, the pressure upon the conical surface of the member 19 causing it to creep outwardly of its complemental bearing, and producing a resultant longitudinal movement of said shaft, which, obviously, will result in urging the clutch member 22, rotating with the shaft 12, into closer association with the female clutch member 31, the latter member, now free to turn on its bearing 10, moving in slipping engagement with the male clutch member 22, the degree of slippage between the two clutch members and the extent of conjoint rotation when engaged, being governed entirely by the weight of the windings of the material as they are disposed upon the reel or spool.

Simultaneously with the winding of the material upon the receiving spool or reel B it must unwind for delivery from the reel or spool A upon which it was initially carried and, as heretofore pointed out, the material, in its passage from one reel to the other, must be maintained substantially taut or under an even tension or pull. Therefore, the unwinding of the material is controlled by the diminishing load, by the same means that cooperate to govern the operation of the winding unit in the performance of its function. For example, when the loaded reel is mounted upon the shaft 12 of the unit at the left of Figure 2, and the ring gear is demeshed from the pinion thereof, the conical surface of the member 19 initially assumes its outermost position relative to its complemental bearing, so that the frictional pressure between the contacting surfaces of the two clutch members is substantially at its maximum. As the shaft 12 rotates anti-clockwise in response to the pull of the material toward the reel or spool of the winding unit, it will be manifest that the clutch member 31 will be locked or coupled to its fixed support, through the action of the ball 32, the clutch member 22, keyed to said shaft rotating relative thereto but in frictional engagement therewith, the effective pressure between the engaged surfaces of the two clutch members gradually diminishing with the lessening of the load imposed upon the shaft 12, and the resultant movement of its shiftable supporting member 19 inwardly of the outer end of its complemental bearing surface.

As will be evident, the frictional pressure between the contacting surfaces of the two clutch members of the unwinding unit, combined with that created between the clutch members of the receiving unit by the upbuilding load, serves to compensate for the differential in peripheral speeds of the material at the two reels or spools, the retarded release or delivery of the material from the unwinding reel and the taking up or winding of the material upon the receiving spool, under a winding effort that is directly responsive to the controlled release of the material, insuring the passage of the material from one reel to the other under an even or constant pull or tension, which is maintained throughout the winding operation so that it is deposited upon the receiving reel or spool in uniformly associated and close or compact convolutions or windings, the tension or pull, however, at no time being sufficient to cause breaking or stretching of the material. This will be clear from the fact that the amount of tension is controlled solely by the material which is the subject of the immediate operation and which, due to the means utilized, provides an ample factor of safety below the critical point of its tensile strength.

From the foregoing, it will be evident that I have evolved a means for transferring material from one carrier to another, as in a so-called re-winding operation, which is susceptible of use in handling various materials, especially those, which because of inherent characteristics, cannot now be satisfactorily subjected to a rewinding operation, without the employment of elaborate and costly mechanisms.

While I have described my invention more or less specifically with reference to the present embodiment, it will be obvious that various structural changes may be made without departing from the spirit and scope thereof. For instance, the winding unit may be power-driven, instead of manually operated and the delivery unit may have the driving means omitted therefrom, the elements for controlling the unwinding of the reels or spools constituting the unit. Again, the method of connecting the clutch members to their supports and the mode of keying the conical bearing members to the work-carrying shaft may be different from those shown, while in lieu of the oil cups 50 and the oil groove 22ª, traversing the surface of the clutch member 22, other lubricant delivery means may be employed, within the purview of the following claims:

I claim:

1. A device for winding material upon a suitable carrier, embodying a supporting standard, a shaft journalled in a bearing on said standard, a clutch member fixed to said shaft, a cooperating clutch member mounted on said shaft bearing, a pinion keyed to said shaft, driving means including a ring gear mounted on said standard for movement relative thereto, into and out of mesh with said pinion, and means on said shaft cooperating with one end of the bearing therefor to render said shaft capable of longitudinal movement relative to its bearing, in response to variations in the load transmitted to said shaft transversely of its axis.

2. A device for winding material upon a suitable carrier, embodying a supporting standard, a shaft journalled in a bearing on said standard, a clutch member fixed to said shaft, a cooperating clutch member mounted on said shaft bearing for rotative movement in one direction, a pinion keyed to said shaft, driving means including a ring gear adapted to be moved into and out of mesh with said pinion and means on said shaft cooperating with one end of the bearing therefor to render said shaft capable of longitudinal movement within its bearing, in response to variations in the load transmitted to said shaft tranversely of its axis of rotation.

3. A mechanism for transferring wound material from one carrier to another by winding it upon the latter, comprising two similar units, each embodying a supporting standard a work-carrying shaft journalled in a bearing on said standard, a clutch member fixed to said shaft, a second clutch member mounted on said shaft bearing, means cooperating with said shaft bearing and said second clutch member to permit the latter to rotate in one direction only, a pinion fixed to said shaft, driving means for said pinion, embodying a gear, movable into and out of engagement with said pinion, and means on said shaft acting in response to variations in the load transmitted transversely of the axis of said shaft to effect a longitudinal movement of said shaft for controlling the frictional pressure between the effective surfaces of said two clutch members, the clutch member mounted upon the shaft bearing of the unit from which the material is being transferred, being automatically locked against rotative movement by the pull exerted upon the material in its passage to the carrier of the winding unit, the rotation of the work-carrying shaft of the delivering unit being controlled solely by the passage of the material to the carrier of the winding unit.

4. A mechanism for winding material, embodying a support including a bearing, a work-carrying shaft mounted in said bearing, a clutch member fixed to said shaft, a second clutch member mounted on said shaft bearing, means fixed to said shaft adapted to function in response to variations in the load transmitted from the work to said shaft transversely of its axis of rotation to produce a longitudinal movement of said shaft for urging the effective surface of the first-named clutch member toward and away from the cooperating surface of the second clutch member, and means automatically controlled by the rotation of the first clutch member in one direction acting to lock the second clutch member against rotative movement on its support, the rotation of the first clutch member in the opposite direction, automatically effecting the release of said second clutch member for intermittent rotative movement in engagement with said first-named clutch member.

5. A winding mechanism embodying a standard, a work-carrying shaft journalled therein, a clutch member fixed to said shaft, a second clutch member mounted for rotative movement independently of said shaft, a pinion fixed to said shaft, means carried by said shaft effective in response to variations in the work load upon said shaft to produce longitudinal movement of the latter to urge the effective surface of the first-named clutch member toward the cooperating surface of the second clutch member, a second shaft parallel to the work-carrying shaft, a gear adapted to mesh with said pinion for imparting rotative motion thereto, means for driving said gear, and means associated with said second shaft to permit said gear to be moved into and out of mesh with said pinion by the longitudinal movement of said second shaft.

JOSEPH CLAYTON.